(12) United States Patent
Yagyu et al.

(10) Patent No.: US 10,315,466 B2
(45) Date of Patent: Jun. 11, 2019

(54) PNEUMATIC TIRE (71) Applicant: SUMITOMO RUBBER INDUSTRIES LTD., Kobe-shi (JP)

(72) Inventors: Kentaro Yagyu, Kobe (JP); Naoki Yukawa, Kobe (JP); Yasuo Mitarai, Kobe (JP); Yasuaki Kuniyasu, Kobe (JP)

(73) Assignee: SUMITOMO RUBBER INDUSTRIES LTD., Kobe-shi (JP)

( * ) Notice: Subject to any disclaimer, the term of this patent is extended or adjusted under 35 U.S.C. 154(b) by 572 days.

(21) Appl. No.: 14/887,545

(22) Filed: Oct. 20, 2015

(65) Prior Publication Data

US 2016/0107488 A1   Apr. 21, 2016

(30) Foreign Application Priority Data

Oct. 20, 2014   (JP) ................... 2014-213582

(51) Int. Cl.
*B60C 13/02*   (2006.01)
(52) U.S. Cl.
CPC .................... *B60C 13/02* (2013.01)
(58) Field of Classification Search
CPC ...................................................... B60C 13/02
See application file for complete search history.

(56) References Cited

U.S. PATENT DOCUMENTS

| | | | | |
|---|---|---|---|---|
| 4,407,346 A | * | 10/1983 | Bandel | B60C 1/0016 |
| | | | | 152/209.5 |
| 2011/0108174 A1* | | 5/2011 | Takahashi | B60C 13/02 |
| | | | | 152/153 |
| 2012/0060994 A1* | | 3/2012 | Hayashi | B60C 13/02 |
| | | | | 152/523 |

FOREIGN PATENT DOCUMENTS

| | | | |
|---|---|---|---|
| JP | 06-032121 | * | 2/1994 |
| JP | 10-058925 | * | 3/1998 |
| JP | 2010-030547 A | | 2/2010 |
| JP | 2013-028300 A | | 2/2013 |
| JP | 2013-095211 | * | 5/2013 |

OTHER PUBLICATIONS

English machine translation of JP10-058925. (Year: 1998).*
English machine translation of JP06-032121. (Year: 1994).*
(Continued)

*Primary Examiner* — Robert C Dye
(74) *Attorney, Agent, or Firm* — Oblon, McClelland, Maier & Neustadt, L.L.P.

(57) ABSTRACT

A pneumatic tire includes a side wall having a side surface and a roughened region formed on the side surface such that the roughened region is extending in circumferential direction. The roughened region includes lands and dimples formed between adjacent lands, the lands include first lands and second lands formed such that the first and second lands are alternately arrayed in the circumferential direction and the first and second lands are inclined relative to radial direction in opposite inclination directions, and the roughened region is formed such that when the tire is mounted on a normal rim and filled with air at normal inflation pressure, the roughened region has an outer periphery formed on radially inner side of position 30 mm away in radially inward direction from tire maximum-width position, and the roughened region has an inner periphery formed on radially outer side of radially outer edge of the rim.

20 Claims, 4 Drawing Sheets (56) References Cited

OTHER PUBLICATIONS

"Diameter Comparison of Light Truck Tire Sizes." Web page <http://http://www.tirerack.com/tires/tiretech/techpage.jsp?techid=53>. Nov. 1, 2011. Retrieved from Internet Archive Wayback Machine <https://web.archive.org/web/20111101144009/http://www.tirerack.com/tires/tiretech/techpage.jsp?techid=53>) (Year: 2011).*

* cited by examiner

PNEUMATIC TIRE

CROSS-REFERENCE TO RELATED APPLICATIONS

The present application is based upon and claims the benefit of priority to Japanese Patent Application No. 2014-213582, filed Oct. 20, 2014, the entire contents of which are incorporated herein by reference.

BACKGROUND OF THE INVENTION

Field of the Invention

The present invention relates to a pneumatic tire, specifically, to a pneumatic tire to be mounted on a light truck.

Description of Background Art

JP2010-30547A and JP2013-28300A describe examples of studies conducted on forming dimples on side surfaces. The entire contents of these publications are incorporated herein by reference.

SUMMARY OF THE INVENTION

According to one aspect of the present invention, a pneumatic tire includes a side wall having a side surface and a roughened region formed on the side surface such that the roughened region is extending in a circumferential direction of the pneumatic tire. The roughened region includes lands and dimples formed between adjacent lands, the lands include first lands and second lands formed such that the first lands and the second lands are alternately arrayed in the circumferential direction and that the first lands and the second lands are inclined relative to a radial direction of the pneumatic tire in opposite inclination directions, and the roughened region is formed such that when the pneumatic tire is mounted on a normal rim and is filled with air at a normal inflation pressure, the roughened region has an outer periphery formed on a radially inner side of a position 30 mm away in a radially inward direction from a tire maximum-width position, and the roughened region has an inner periphery formed on a radially outer side of a radially outer edge of the normal rim.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

The embodiments will now be described with reference to the accompanying drawings, wherein like reference numerals designate corresponding or identical elements throughout the various drawings.

Figure 1:
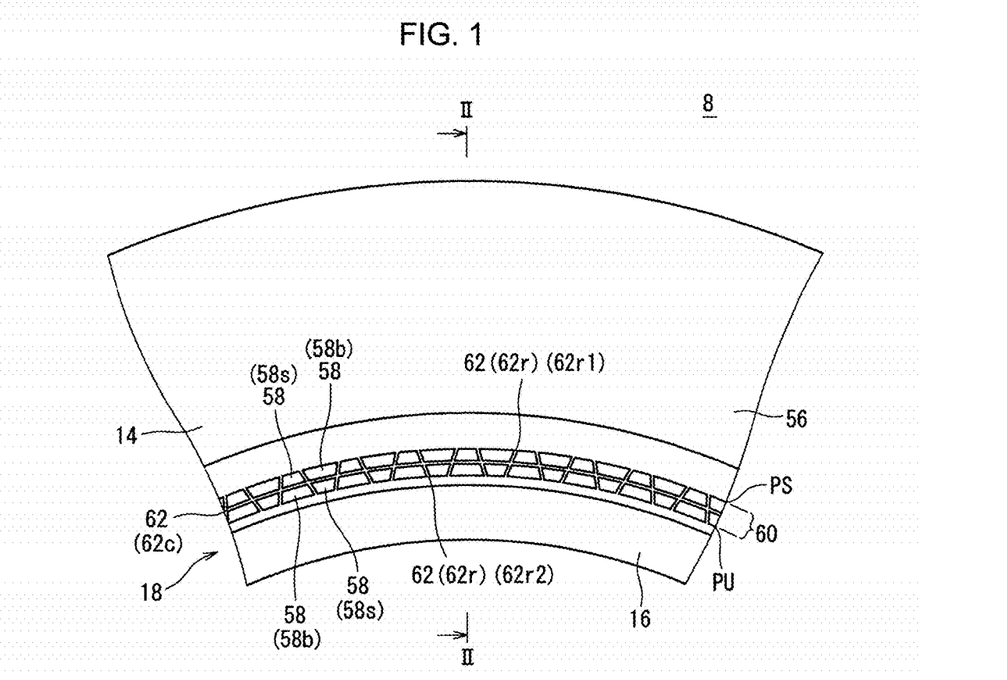
FIG. 1 is a front view showing part of a pneumatic tire according to an embodiment of the present invention.
Figure 2:
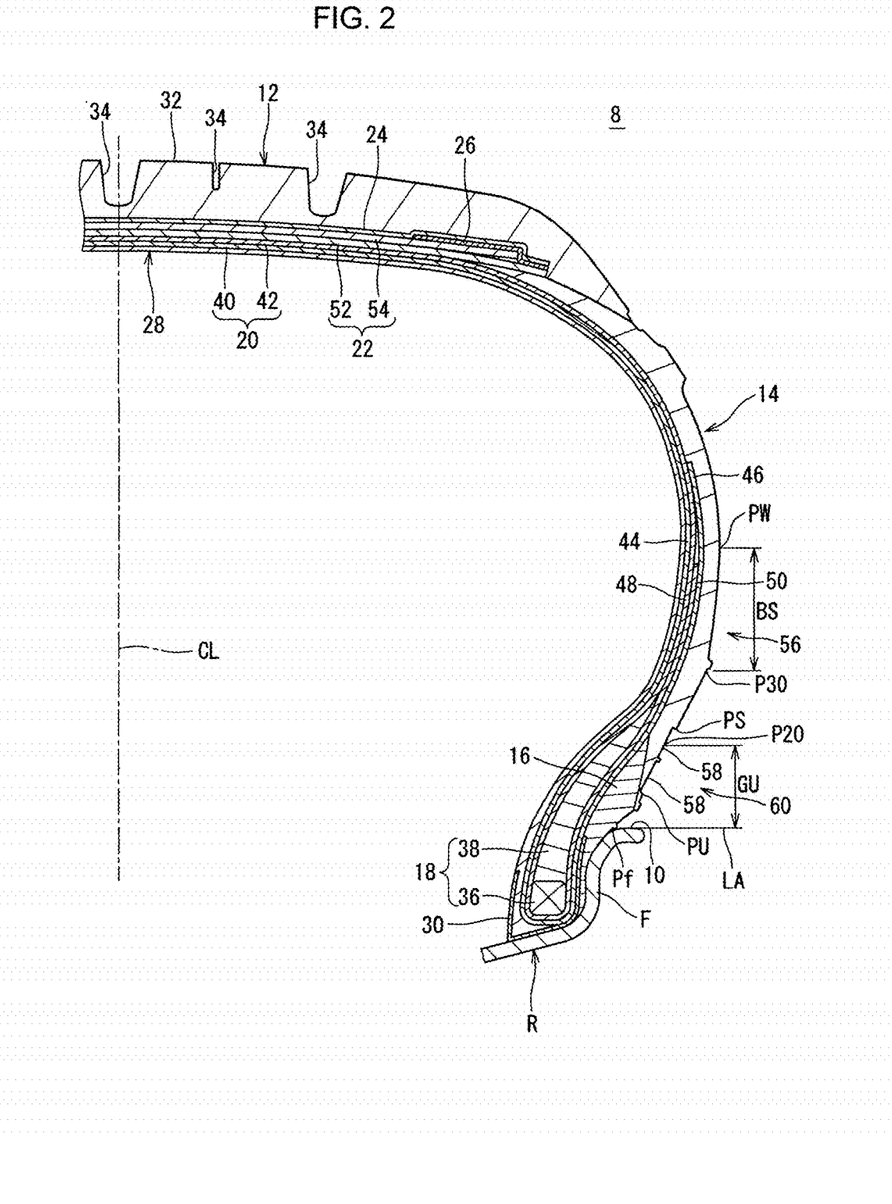
FIG. 2 is a cross-sectional view taken along the II-II line in FIG. 1.

FIG. 1 shows pneumatic tire 8. FIG. 2 is a cross-sectional view taken along the II-II line of tire 8 in FIG. 1. In FIG. 2, vertical directions are radial directions of tire 8, horizontal directions are axial directions of tire 8, and directions perpendicular to the drawing sheet are circumferential directions of tire 8. Dotted line (CL) in FIG. 2 indicates the equatorial plane of tire 8. Except for the tread patterns, tire 8 is formed to be symmetrical at the equatorial plane. The II-II line is set to intersect a circumferential direction at 90 degrees.

Tire 8 in FIG. 2 is mounted on rim (R). Rim (R) is a normal rim. Tire 8 is filled with air at a normal inflation pressure.

In the embodiments, dimensions and angles of tire 8 and each member of tire 8 are measured when tire 8 is mounted on a normal rim and is filled with air at a normal inflation pressure. No load is exerted on tire 8 at the time of measurement. In the present application, a normal rim indicates a rim specified for tire 8 by the regulatory system tire 8 is based upon: it is specified as a "Normal Rim" by JATMA, "Design Rim" by TRA, and "Measuring Rim" by ETRTO. Also, in the present application, a normal inflation pressure indicates air pressure specified for tire 8 by the regulatory system. It is specified as "Maximum Air Pressure" by JATMA, maximum value listed in a table "Tire Load Limits at Various Cold Inflation Pressures" by TRA, and "Inflation Pressure" by ETRTO.

In FIG. 2, Reference "PW" indicates a specified position on the outer surface of tire 8. At the position denoted as (PW), the profile of tire 8 shows the maximum axial width. In other words, the width of tire 8 is maximum at position (PW).

In FIG. 2, Reference "Pf" indicates a specified position on the outer surface of tire 8. Position (Pf) is where the outer surface of tire 8 intersects straight line (LA), which passes through radially outer edge 10 of rim (R) and extends in an axial direction. Position (Pf) corresponds to radially outer edge 10 of rim (R).

Tire 8 includes tread 12, a pair of sidewalls 14, a pair of clinches 16, a pair of beads 18, carcass 20, belt 22, band 24, a pair of edge bands 26, inner liner 28 and a pair of chafers 30. Tire 8 is a tubeless tire. Tire 8 is for mounting on a light truck, corresponding to light truck tires specified in Chapter B of a JATMA yearbook.

Tread 12 is formed in a shape protruding in a radially outward direction. Tread 12 forms contact patch 32 that makes contact with the ground surface. Grooves 34 are formed in tread 12. Tread patterns are formed by grooves 34. Tread 12 is made up of a base layer and a cap layer (not shown). The cap layer is positioned on the radially outer side of the base layer. The cap layer is laminated on the base layer. The base layer is made of a crosslinked rubber with excellent adhesiveness. A typical base material for the base layer is natural rubber. The cap layer is made of a crosslinked rubber that exhibits excellent wear resistance, heat resistance and grip performance.

Each sidewall 14 extends from an edge of tread 12 approximately in a radially inward direction. Sidewall 14 is made of a crosslinked rubber that exhibits excellent cut resistance and weatherability. Sidewall 14 prevents damage to carcass 20.

Each clinch 16 is positioned approximately on the radially inner side of sidewall 14. Clinch 16 is positioned on the axially outer side of bead 18 and carcass 20. Clinch 16 is made of a crosslinked rubber that exhibits excellent wear resistance. Clinch 16 abuts flange (F) of rim (R).

Each bead 18 is positioned on the axially inner side of clinch 16. Bead 18 includes core 36 and apex 38 extending from core 36 in a radially outward direction. Core 36 is in a ring shape and includes wound non-stretchable wires. A typical wire material is steel. Apex 38 tapers in a radially outward direction. Apex 38 is made of a hard crosslinked rubber.

Carcass 20 is made of first carcass ply 40 and second carcass ply 42. First and second carcass plies (40, 42) are bridged between beads 18 on both sides along tread 12 and sidewalls 14. First carcass ply 40 is turned up around core 36 from the axially inner side toward the outer side. Such a turned-up structure forms main portion 44 and turn-up portion 46 in first carcass ply 40. Second carcass ply 42 is turned up around core 36 from the axially inner side toward the outer side. Such a turned-up structure forms main portion 48 and turn-up portion 50 in second carcass ply 42. The edge of turn-up portion 46 of first carcass ply 40 is positioned on the radially outer side of the edge of turn-up portion 50 of second carcass ply 42.

Although omitted from the drawing, first and second carcass plies (40, 42) are each made of numerous cords positioned parallel to each other and a topping rubber. The absolute value of the angle each cord makes to the equatorial plane is 75 to 90 degrees. In other words, carcass 20 is formed in a radial structure. Cords are organic fibers. Preferred examples of organic fibers are polyester fibers, nylon fibers, rayon fibers, polyethylene naphthalate fibers and aramid fibers. Carcass 20 may also be formed with three or more plies.

Belt 22 is positioned on the radially inner side of tread 12. Belt 22 is laminated on carcass 20. Belt 22 reinforces carcass 20. Belt 22 is made of inner layer 52 and outer layer 54. As shown in FIG. 2, the axial width of inner layer 52 is slightly greater than that of outer layer 54. Although omitted from the drawing, inner layer 52 and outer layer 54 are each made of numerous cords positioned parallel to each other and a topping rubber, and are set to incline relative to the equatorial plane. Absolute values of inclination angles may be at least 10 degrees but no greater than 35 degrees. Relative to the equatorial plane, the inclination direction of the cords in inner layer 52 is opposite the inclination direction of the cords in outer layer 54. The preferred material for cords is steel, but organic fibers may also be used. The axial width of belt 22 is preferred to be at least 0.7 times the maximum width of tire 8. Belt 22 may be formed with three or more layers.

Band 24 is positioned on the radially outer side of belt 22. The axial width of band 24 is greater than that of belt 22. Although omitted from the drawing, band 24 is made of a cord and a topping rubber. The cord is wound helically. Band 24 is a so-called jointless structure. The cord extends in a substantially circumferential direction. The angle made by the cord relative to a circumferential direction is preferred to be no greater than 5 degrees, more preferably no greater than 2 degrees. Since belt 22 is confined by the cord, lifting of belt 22 is suppressed. The cord is made of organic fibers, for example, nylon fibers, polyester fibers, rayon fibers, polyethylene naphthalate fibers, and aramid fibers.

Each edge band 26 is positioned on the radially outer side of belt 22 and near the edge of belt 22. Although omitted from the drawing, edge band 26 is made of a cord and a topping rubber. The cord is wound helically. Edge band 26 is a so-called jointless structure. The cord extends in a substantially circumferential direction. The angle made by the cord relative to a circumferential direction is preferred to be no greater than 5 degrees, more preferably no greater than 2 degrees. Since belt 22 is confined by the cord, lifting of belt 22 is suppressed. The cord is made of organic fibers, for example, nylon fibers, polyester fibers, rayon fibers, polyethylene naphthalate fibers and aramid fibers.

Belt 22, band 24 and paired edge bands 26 make up a reinforcement layer. A reinforcement layer may be made of only belt 22, or only band 24. Alternatively, it is an option not to form edge bands 26 but to form a reinforcement layer with belt 22 and band 24.

Inner liner 28 is positioned on the inner side of carcass 20. Inner liner 28 is bonded to the inner surface of carcass 20. Inner liner 28 is made of a crosslinked rubber with excellent air impermeability. A typical base material for inner liner 28 is butyl rubber or halogenated butyl rubber. Inner liner 28 maintains the inflation pressure of tire 8.

Each chafer 30 is positioned near bead 18. When tire 8 is mounted on rim (R), chafer 30 abuts rim (R). The vicinity of bead 18 is protected by such an abutting structure. In the present embodiment, chafer 30 is made of cloth and rubber impregnated in the cloth. Chafer 30 may be integrated with clinch 16. In such a structure, the same material as for clinch 16 is used for chafer 30.

As shown in FIGS. 1 and 2, numerous dimples 58 are formed on side surface 56 of tire 8. Dimples 58 are formed in a circumferential direction. In an embodiment of the present invention, side surface 56 is defined as, among the regions of the outer surface of tire 8, a region that is visible when seen in a tire axial direction. In tire 8, numerous dimples 58 are formed on the surface of sidewall 14.

In an embodiment of the present invention, roughened region 60 is where dimples 58 are formed. In FIGS. 1 and 2, Reference "PS" indicates the radially outer periphery of roughened region 60. Outer periphery (PS) corresponds to the radially outermost edges of dimples 58. In FIGS. 1 and 2, Reference "PU" indicates the radially inner periphery of roughened region 60. Inner periphery (PU) corresponds to the radially innermost edges of dimples 58. The zone from outer periphery (PS) to inner periphery (PU) is specified as roughened region 60 of side surface 56. Roughened region 60 extends continuously in a circumferential direction.

Figure 3:
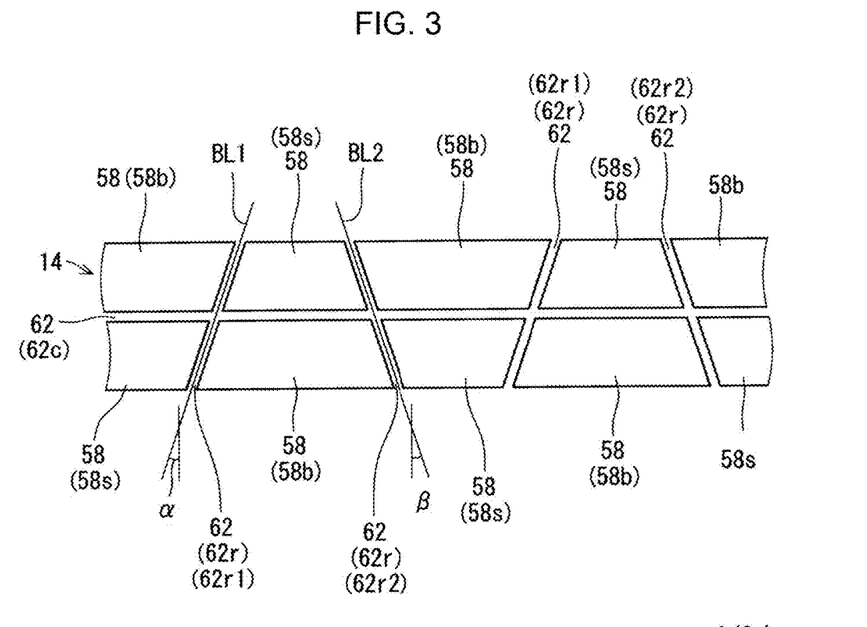
FIG. 3 is an enlarged front view showing part of the sidewall of the tire in FIG. 2.

FIG. 3 shows part of the surface of sidewall 14. In FIG. 3, the vertical directions are radial directions of tire 8, horizontal directions are circumferential directions of tire 8, and directions perpendicular to the drawing sheet are axial directions of tire 8.

FIG. 3 shows some of numerous dimples 58 formed in roughened region 60. In roughened region 60, a land 62 is present between a dimple 58 and its adjacent dimple 58. In other words, numerous lands 62 are formed in roughened region 60 of tire 8. A dimple 58 is formed between a land 62 and its adjacent land 62.

Land 62 is set to protrude from the bottom of a dimple 58. In tire 8, the portion of land 62 is thicker, and the portion of dimple 58 is thinner. Thus, in roughened region 60 of tire 8, portions of lands 62 are less likely to deform, whereas portions of dimples 58 are more likely to deform.

In tire 8, roughened region 60 includes numerous lands (62r) that go through roughened region 60 from the radially inner periphery (PU) toward outer periphery (PS). Lands (62r) are formed in a circumferential direction. Lands (62r) are each formed in a straight line. No bent portion is formed in land (62r).

In tire 8, numerous lands (62r) radially going through roughened region 60 include first lands (62r1) and second lands (62r2). First land (62r1) and second land (62r2) are alternately arrayed in a circumferential direction.

In tire 8, first land (62r1) and second land (62r2) are set to incline relative to a radial direction. The inclination direction of first land (62r1) is opposite the inclination direction of second land (62r2). The pitch of first lands (62r1) is set the same as that of second lands (62r2).

In FIG. 2, Reference "P30" indicates a position 30 mm away in a radially inward direction from maximum-width position (PW) of tire 8. In the present embodiment, the zone from position (PW) to position (P30) is denoted as "BS."

In tire 8, the portion of bead 18 is fixed to rim (R). A greater load is exerted on the portion of bead 18. A greater load is exerted near rim (R) of tire 8.

When tire 8 is mounted on rim (R) and is filled with air at a normal inflation pressure, the outer periphery (PS) of roughened region 60 is located on the radially inner side of position (P30). Inner periphery (PU) of roughened region 60 is located on the radially outer side of position (Pf). Namely, roughened region 60 is located between position (Pf) and position (P30) in a radial direction. Roughened region 60 is provided near rim (R) where a greater load is exerted.

In tire 8, dimple 58 is formed between first land (62r1) and second land (62r2). Since dimples 58 generate turbulence, roughened region 60 of tire 8 facilitates dissipation of heat. Compared with a tire without roughened region 60 near bead 18, the temperature near bead 18 is less likely to rise in tire 8. Roughened region 60 suppresses accumulation of heat near bead 18.

In roughened region 60 of tire 8, first lands (62r1) and second lands (62r2) extend in a straight line to incline relative to a radial direction. Roughened region 60 effectively contributes to torsional rigidity. Moreover, since the inclination direction of first lands (62r1) is opposite the inclination direction of second lands (62r2), roughened region 60 effectively contributes to rigidity regardless of the directions of distortion. Roughened region 60 suppresses deformation near bead 18. Even when a load equal to the load index is exerted on tire 8, warping is less near bead 18. Smaller degrees of warping suppress concentration of distortion and accumulation of heat.

A greater degree of warping is observed near position (PW) of tire 8. Since tire 8 is formed to protrude in an axially outward direction, the outer side of tire 8 near position (PW) is stretched in a radial direction by a greater force.

As described above, outer periphery (PS) of roughened region 60 of tire 8 is located on the inner side of position (P30). In tire 8, roughened region 60 is not formed near position (PW) especially in zone "BS" where a greater force is exerted to stretch the tire in a radial direction. Damage such as cracking in sidewall 14 is effectively prevented in tire 8. Tire 8 exhibits excellent durability.

In tire 8, dimples 58 in roughened region 60 facilitate dissipation of heat near bead 18 while first and second lands (62r1, 62r2) in roughened region 60 effectively reinforce the portion near bead 18. Concentration of distortion and generation of heat is sufficiently suppressed in the portion near bead 18. Damage such as looseness and frayed cords is less likely to occur near bead 18. Moreover, as described above, the position of outer periphery (PS) in roughened region 60 is designed not to cause damage such as cracking in sidewall 14. Tire 8 exhibits excellent durability. Accordingly, there is no need to increase the number of plies of carcass 20, nor is there any need to add a new member such as filler to enhance durability of the tire. According to the present embodiment, durability of pneumatic tire 8 is enhanced without incurring an increase in manufacturing cost. The structure and position of roughened region 60 of the present embodiment is effective when employed in a tire where a greater load is exerted, namely, a tire with a load index exceeding 100.

In FIG. 2, Reference "P20" indicates a position 20 mm away in a radially outward direction from position (Pf) corresponding to radially outer edge 10 of rim (R). In the present embodiment, the zone from position (Pf) to position (P20) is denoted as "GU."

In tire 8, inner periphery (PU) of roughened region 60 is preferred to be located on the radially inner side of position (P20). In other words, inner periphery (PU) is preferred to be located in zone "GU." By so setting, roughened region 60 is properly provided near rim (R) where a greater load is exerted. Roughened region 60 effectively contributes to suppressing concentration of distortion and generation of heat. The durability of tire 8 is further enhanced.

In FIG. 3, solid line (BL1) is a straight line obtained by extending first land (62r1). Solid line (BL1) passes through the center of the width of first land (62r1). Angle ($\alpha$) is the angle that solid line (BL1) makes relative to a radial direction. Angle ($\alpha$) is the inclination angle of first land (62r1). Solid line (BL2) is a straight line obtained by extending second land (62r2). Solid line (BL2) passes through the center of the width of second land (62r2). Angle ($\beta$) is the angle that solid line (BL2) makes relative to a radial direction. Angle ($\beta$) is the inclination angle of second land (62r2).

In tire 8, the absolute value of inclination angle ($\alpha$) of first land (62r1) is preferred to be at least 10 degrees but no greater than 30 degrees. When the absolute value of inclination angle ($\alpha$) is set to be at least 10 degrees, first land (62r1) effectively contributes to tire rigidity. Roughened region 60 effectively contributes to suppressing concentration of distortion and generation of heat. From those viewpoints, the absolute value of inclination angle ($\alpha$) is more preferred to be at least 15 degrees. When the absolute value of inclination angle ($\alpha$) is set at no greater than 30 degrees, dimples 58 are formed to facilitate the generation of turbulence. Roughened region 60 effectively contributes to the dissipation of heat. From those viewpoints, the absolute value of inclination angle ($\alpha$) is more preferred to be no greater than 25 degrees In tire 8, the absolute value of inclination angle ($\beta$) of second land (62r2) is preferred to be at least 10 degrees but no greater than 30 degrees. When the absolute value of inclination angle ($\beta$) is set to be at least 10 degrees, second land (62r2) effectively contributes to rigidity. In tire 8, roughened region 60 effectively contributes to suppressing concentration of distortion and generation of heat. From those viewpoints, the absolute value of inclination angle ($\beta$) is more preferred to be at least 15 degrees. When the absolute value of inclination angle ($\beta$) is set at no greater than 30 degrees, dimples 58 are formed to facilitate the generation of turbulence. Roughened region 60 effectively contributes to dissipation of heat. From those viewpoints, the absolute value of inclination angle ($\beta$) is more preferred to be no greater than 25 degrees.

In tire 8, the absolute value of inclination angle ($\alpha$) is preferred to be equal to the absolute value of inclination angle ($\beta$). By so setting, the rigidity in roughened region 60 is well balanced. Particular distortion is less likely to occur near bead 18. Excellent durability is achieved in tire 8. In the present application, when the difference between absolute values of inclination angles (α, β) is within a range of −5 degrees to 5 degrees, the absolute value of inclination angle (α) is considered to be equal to the absolute value of inclination angle (β).

As seen in FIG. 3, roughened region 60 is set so that the circumferential length between first land (62r1) and its adjacent second land (62r2) gradually increases from the radially outer side toward the inner side or from the radially inner side toward the outer side. In tire 8, the absolute value of inclination angle (α) is equal to the absolute value of inclination angle (β) and outer periphery (PS) of roughened region 60 is parallel to inner periphery (PU). The outline of dimple 58 between first land (62r1) and second land (62r2) is formed in an isosceles trapezoid. It is an option to set the outline of dimple 58 between first land (62r1) and second land (62r2) to be triangular by adjusting the distance between first land (62r1) and second land (62r2). The outline of dimple 58 is appropriately determined by considering cost and potential impact on durability.

In tire 8, first land (62r1) and second land (62r2) are partitioned by land (62c) extending in a circumferential direction. Accordingly, larger dimple (58b) outlined to be isosceles trapezoidal and a smaller dimple (58s) outlined to be isosceles trapezoidal are formed in roughened region 60. Dimples 58 in two sizes are formed in a radial direction. Numerous dimples 58 are formed in two rows. Dimples 58 may be arrayed in three or more rows by dividing first land (62r1) and second land (62r2) with multiple lands (62c). The number of dimple rows is appropriately determined by considering manufacturing cost and potential impact on durability.

EXAMPLES

In the following, effects according to an embodiment of the present invention are verified through examples. However, descriptions of the examples are not intended to limit the scope of the invention.

Example 1

A tire was prepared to have structures shown in FIG. 1~3. The tire size is 245/75R16. The parameters of the roughened region in Example 1 are shown in Table 1.

In the tire, outer periphery (PS) of the roughened region is located on the radially inner side of position (P30). Such a structure is denoted by "GS" in the space of row "outer periphery of roughened region" in Table 1. Inner periphery (PU) of the roughened region is located between position (Pf) and position (P20) in a radial direction. Such a structure is denoted by "GU" in the space of row "inner periphery of roughened region" in Table 1 below.

No filler is provided in the tire. Lack of filler is denoted by "N" in the space of row "filler" in Table 1. The carcass of the tire is made of two carcass plies as shown in FIG. 2.

Comparative Example 1 and 2

Tires were prepared for Comparative Example 1 and 2 the same as in Example 1 except that no roughened region was provided in either tire. In addition, filler was added to the tire of Comparative Example 1. The addition of filler is denoted by "Y" in the space of row "filler" in Table 1.

Example 2 and Comparative Example 3

Tires were prepared for Example 2 and Comparative Example 3 the same as in Example 1 except that inner periphery (PU) of each roughened region was located on the radially outer side of position (P20). Such a structure is denoted by "BU" in the space of row "inner periphery of roughened region" in Table 1. In the tire of Comparative Example 3, outer periphery (PS) of the roughened region is located between positions (PW) and (P30) in a radial direction. Such a structure is denoted by "BS" in the space of row "outer periphery of roughened region" in Table 1.

Example 3 and Comparative Example 4~6

Tires for Example 3 and Comparative Example 4~6 were each prepared the same as in Example 1 except that a roughened region was structured as specified in Table 2 below. In Example 3, triangular dimples are formed between first and second lands.

Example 4~9

Tires of Example 4~9 were each prepared the same as in Example 1 except that inclination angle (α) of first lands and inclination angle (β) of second lands are set as specified in Table 3 below.

Durability

Each tire was mounted on a normal rim and filled with air at an inflation pressure of 550 kPa. The tire was equipped on a drum-type running test machine and a vertical load of 16.69 kN was exerted on the tire. The tire was run at a speed of 80 km/h on the drum with a radius of 1.7 m until damage occurred. After that, the appearance of the tire was observed to see whether or not there is cord break up (CBU) of carcass cords, casing looseness of apex (CAL) at the border of carcass and apex, or sidewall cracking (SWC). When any of the above was observed, the length of damage was measured to put the degree of damage in values. The results are shown in Table 1~3 in indices by setting the value obtained in Comparative Example 1 at 100. The greater the value, the lower is the degree of damage and the more preferable it is. The greater the value, the more outstanding is the durability.

Cost

Manufacturing cost per tire was calculated. The results are shown in Table 1~3 in indices by setting the result obtained in Comparative Example 1 at 100. The greater the value, the lower is the indicated cost.

TABLE 1

| | | Evaluation Results | | | | |
|---|---|---|---|---|---|---|
| | | Comp. Example 1 | Comp. Example 2 | Example 1 | Example 2 | Comp. Example 3 |
| Roughened Region | Outer Periphery | — | — | GS | GS | BS |
| | Inner Periphery | — | — | GU | BU | BU |
| | Structure | — | — | FIG. 3 | FIG. 3 | FIG. 3 |
| 1st Land | Angle α [°] | — | — | 20 | 20 | 20 |
| 2nd Land | Angle β [°] | — | — | −20 | −20 | −20 |

TABLE 1-continued

Evaluation Results

|  | | Comp. Example 1 | Comp. Example 2 | Example 1 | Example 2 | Comp. Example 3 |
|---|---|---|---|---|---|---|
| Filler | | Y | N | N | N | N |
| CBU | | 100 | 70 | 130 | 80 | 80 |
| CAL | | 100 | 70 | 110 | 80 | 80 |
| SWC | | 100 | 100 | 100 | 100 | 90 |
| Cost | | 100 | 105 | 105 | 105 | 105 |

TABLE 2

Evaluation Results

| | | Comp. Example 4 | Comp. Example 5 | Comp. Example 6 | Example 3 |
|---|---|---|---|---|---|
| Roughened Region | Outer Periphery | GS | GS | GS | GS |
| | Inner Periphery | GU | GU | GU | GU |
| | Structure | FIG. 6 | FIG. 4 | FIG. 5 | — |
| 1st Land | Angle α [°] | 20 | 90 | — | 20 |
| 2nd Land | Angle β [°] | 20 | 90 | — | -20 |
| Filler | | N | N | N | N |
| CBU | | 115 | 106 | 110 | 132 |
| CAL | | 104 | 101 | 103 | 111 |
| SWC | | 100 | 100 | 100 | 100 |
| Cost | | 105 | 105 | 105 | 102 |

TABLE 3

Evaluation Results

| | | Example 4 | Example 5 | Example 6 | Example 7 | Example 8 | Example 9 |
|---|---|---|---|---|---|---|---|
| Roughened Region | Outer Periphery | GS | GS | GS | GS | GS | GS |
| | Inner Periphery | GU | GU | GU | GU | GU | GU |
| | Structure | FIG. 3 | FIG. 3 | FIG. 3 | FIG. 3 | FIG. 3 | FIG. 3 |
| 1st Land | Angle α [°] | 5 | 10 | 15 | 25 | 30 | 40 |
| 2nd Land | Angle β [°] | -5 | -10 | -15 | -25 | -30 | -40 |
| Filler | | N | N | N | N | N | N |
| CBU | | 108 | 118 | 125 | 124 | 119 | 106 |
| CAL | | 103 | 105 | 107 | 108 | 106 | 102 |
| SWC | | 100 | 100 | 100 | 100 | 100 | 100 |
| Cost | | 102 | 103 | 104 | 106 | 107 | 107 |

As shown in Table 1~3, tires of the examples achieved higher evaluation than tires of the comparative examples. From the evaluation results, it is clear that a tire according to an embodiment of the present invention is outstanding.

The aforementioned roughened region is applicable to other various tires.

Tires support a vehicle body. When load is exerted on the tires, tires warp. When tires warp, they become distorted. Distortion tends to concentrate on the border of the carcass and apex, the tip of the apex, the border of the carcass and clinch and the like. In the region of concentrated distortion, damage such as looseness and frayed cords tends to occur.

Where there is distortion, namely, deformation, it is accompanied by generation of heat. Thus, in regions where distortion occurs, thermal deterioration in addition to mechanical deterioration may progress.

Figure 4:
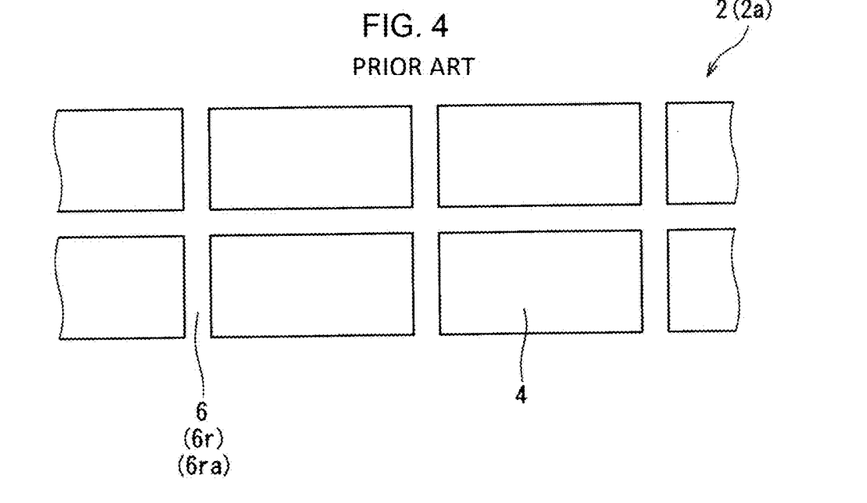
FIG. 4 is an enlarged front view showing part of the side surface of a conventional tire.
Figure 5:
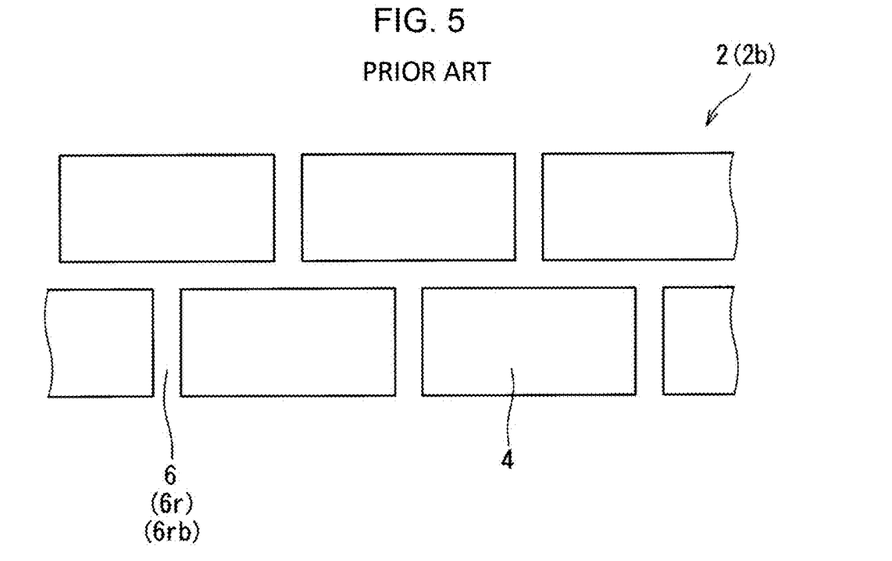
FIG. 5 is an enlarged front view showing part of the side surface of another conventional tire different from that shown in FIG. 4.
Figure 6:
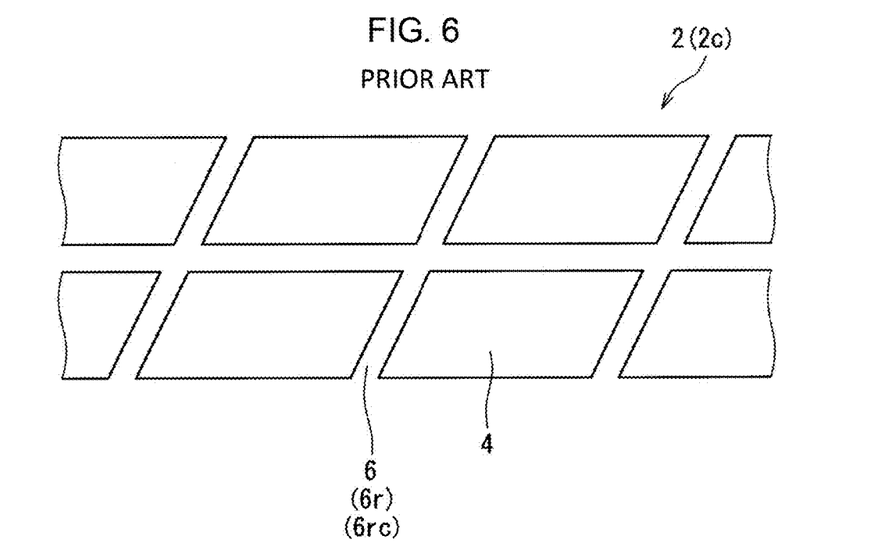
FIG. 6 is an enlarged front view showing part of the side surface of yet another conventional tire different from that shown in FIG. 4.

The side surface of a tire may be provided with a roughened region where numerous dimples are formed. FIG. 4~6 show examples of how dimples 4 are formed in roughened region 2. In each of FIG. 4~6, horizontal directions are tire circumferential directions, vertical directions are tire radial directions, and directions perpendicular to the drawing sheet are tire axial directions.

When a vehicle runs, turbulence is generated in roughened region 2. Turbulence facilitates dissipation of heat from the tire. Since the temperature is less likely to rise in such a tire, progression of thermal deterioration is suppressed.

The maximum load capacity of a tire is indicated by an index, for example, by a load index. The load index is specified by JATMA regulations for each tire. The load index is a numerical code associated with the maximum load a tire can carry under certain specified conditions.

Trucks run with a load mounted thereon. When a truck runs with a load approximately equal to the maximum load capacity of the tire, an equal load corresponding to the maximum load index is exerted on the tire. Accordingly, the tire warps significantly at its beads. A significant degree of warping causes distortion. A tire with a load index exceeding 100 is capable of carrying a greater load. The beads of the tire tend to suffer damage.

A smaller degree of warping contributes to durability. To achieve a smaller degree of warping, the carcass may be formed with three carcass plies. However, such a structure tends to make a heavier tire and increase manufacturing costs. As another option to achieve a smaller degree of warping, filler may be added to the beads. However, such a structure also causes a heavier tire and increased cost.

Roughened regions 2 may be provided on side surfaces of a tire to suppress thermal deterioration from progressing so as to improve the durability of the tire.

In roughened region 2, land 6 is present between adjacent dimples 4. The tire thickness at land 6 is greater, whereas the tire thickness at dimple 4 is less. It is harder to bend the portion of land 6, but easier to bend the portion of dimple 4. Region 2 exhibits particular rigidity.

When a load is exerted on a tire, the load is distributed in various directions. Depending on the directions of a load, the tire may be distorted, resulting in deformation. Torsional rigidity is an important element of a tire.

Roughened regions 2 shown in FIG. 4~6 each include lands (6r) that go through roughened region 2 from the radially inner side toward the radially outer side.

FIG. 4 shows roughened region (2a), where lands (6ra) go through roughened region (2a) in a straight line. As shown in FIG. 4, lands (6ra) each extend in a radial direction. Lands (6ra) do not contribute much to torsional rigidity.

FIG. 5 shows roughened region (2b), where lands (6rb) go through roughened region (2b) in the form of steps. Lands (6rb) in the form of steps contribute to torsional rigidity to some degree, but the degree is insufficient. Distortion tends to concentrate where lands (6rb) make turns.

FIG. 6 shows roughened region (2c), where lands (6rc) go through roughened region (2c) in a straight line. As is clear in FIG. 6, lands (6rc) are inclined relative to a radial direction. All lands (6rc) are set to incline in the same direction. Lands (6rc) contribute to torsional rigidity, but they may not mitigate distortion depending on the direction of the distortion.

As described above, positions and shapes of dimples 4 affect the positions and shapes of lands 6. Positions and shapes of lands 6 affect the torsional rigidity of a tire. Positions and shapes of dimples 4 have been studied from various viewpoints; however, studies of the reinforcing effects of lands 6 are insufficient. More effort is needed to enhance tire durability without causing an increase in manufacturing costs.

A pneumatic tire according to an embodiment of the present invention has enhanced durability without incurring an increase in manufacturing costs.

A pneumatic tire according to an embodiment of the present invention has a roughened region, which is formed on the side surface and extends in a circumferential direction. The roughened region includes numerous lands, and a dimple is present between a land and its adjacent land. The lands include first lands and second lands. First lands and second lands are alternately arrayed in a circumferential direction. The first lands and second lands are set to incline relative to a radial direction. The inclination direction of the first lands is opposite the inclination direction of the second lands. When the tire is mounted on a normal rim and is filled with air at a normal inflation pressure, the outer periphery of the roughened region is located on the radially inner side of a position 30 mm away in a radially inward direction from the tire maximum-width position. The inner periphery of the roughened region is located on the radially outer side of the radially outer edge of the rim.

In the aforementioned pneumatic tire, the absolute value of the inclination angle of the first land is preferred to be at least 10 degrees but no greater than 30 degrees, and the absolute value of the inclination angle of the second land is preferred to be at least 10 degrees but no greater than 30 degrees.

In the aforementioned pneumatic tire, the absolute value of the inclination angle of the first land is preferred to be the same as the absolute value of the inclination angle of the second land.

In the aforementioned pneumatic tire, the inner periphery of the roughened region is preferred to be located on the radially inner side of a position 20 mm away in a radially outward direction from the radially outer edge of the rim.

A pneumatic tire according to an embodiment of the present invention is provided with a roughened region near the rim where a greater load is exerted. The roughened region includes first and second lands set to extend in a radially inclined direction. The roughened region effectively contributes to torsional rigidity. Since the inclination direction of first lands is opposite the inclination direction of second lands, the roughened region effectively contributes to torsional rigidity regardless of the direction of distortion. Moreover, dimples formed among first lands and second lands generate turbulence, and the roughened region facilitates dissipation of heat. Such a tire is resistant to damage. The tire has excellent durability. To enhance durability, there is no need to increase the number of carcass plies, nor is there any need to add new members such as filler. A tire according to an embodiment of the present invention exhibits enhanced durability, and yet no increase in manufacturing cost is incurred.

Obviously, numerous modifications and variations of the present invention are possible in light of the above teachings. It is therefore to be understood that within the scope of the appended claims, the invention may be practiced otherwise than as specifically described herein.

What is claimed is:

1. A pneumatic tire, comprising:
   a side wall having a side surface and a roughened region formed on the side surface such that the roughened region is extending in a circumferential direction of the pneumatic tire,
   wherein the roughened region comprises a plurality of lands and a plurality of dimples formed between adjacent lands, the plurality of lands comprises a plurality of first lands and a plurality of second lands formed such that the first lands and the second lands are alternately arrayed in the circumferential direction, that the first lands and the second lands are inclined relative to a radial direction of the pneumatic tire in opposite inclination directions, that each of the first lands has an absolute value of an inclination angle which is set in a range of 10 degrees to 25 degrees, and that each of the second lands has an absolute value of an inclination angle which is set in a range of 10 degrees to 25 degrees, and the roughened region is formed such that when the pneumatic tire is mounted on a normal rim and is filled with air at a normal inflation pressure, the roughened region has an outer periphery formed on a radially inner side of a position 30 mm away in a radially inward direction from a tire maximum-width position, and the roughened region has an inner periphery formed on a radially outer side of a radially outer edge of the normal rim.

2. The pneumatic tire according to claim 1, wherein each of the first lands has the absolute value of the inclination angle which is set in a range of 15 degrees to 25 degrees, and each of the second lands has the absolute value of the inclination angle which is set in a range of 15 degrees to 25 degrees.

3. The pneumatic tire according to claim 2, wherein each of the first lands has the absolute value of the inclination angle which is set to be equal to the absolute value of the inclination angle of each of the second lands.

4. The pneumatic tire according to claim 3, wherein the inner periphery of the roughened region is formed on the radially inner side of a position 20 mm away in a radially outward direction from the radially outer edge of the normal rim.

5. The pneumatic tire according to claim 2, wherein the inner periphery of the roughened region is formed on the radially inner side of a position 20 mm away in a radially outward direction from the radially outer edge of the normal rim.

6. The pneumatic tire according to claim 1, wherein each of the first lands has the absolute value of the inclination angle which is set to be equal to the absolute value of the inclination angle of each of the second lands.

7. The pneumatic tire according to claim 6, wherein the inner periphery of the roughened region is formed on the radially inner side of a position 20 mm away in a radially outward direction from the radially outer edge of the normal rim.

8. The pneumatic tire according to claim 1, wherein the inner periphery of the roughened region is formed on the radially inner side of a position 20 mm away in a radially outward direction from the radially outer edge of the normal rim.

9. The pneumatic tire according to claim 1, wherein the plurality of lands and the plurality of dimples are formed such that the plurality of dimples is arrayed in a plurality of rows between the outer periphery and inner periphery of the roughened region.

10. The pneumatic tire according to claim 1, wherein the plurality of lands and the plurality of dimples are formed such that the plurality of dimples is arrayed in a plurality of rows partitioned by a land extending in the circumferential direction between the outer periphery and inner periphery of the roughened region and comprises a plurality of large dimples and a plurality of small dimples alternately arrayed to form each of the rows.

11. The pneumatic tire according to claim 1, wherein the plurality of lands and the plurality of dimples are formed such that the plurality of dimples is arrayed in a plurality of rows partitioned by a land extending in the circumferential direction between the outer periphery and inner periphery of the roughened region and comprises a plurality of large dimples and a plurality of small dimples alternately arrayed to form each of the rows such that each of the large dimples has an isosceles trapezoidal shape and that each of the small dimples has an isosceles trapezoidal shape.

12. A pneumatic tire, comprising:
a side wall having a side surface and a roughened region formed on the side surface such that the roughened region is extending in a circumferential direction of the pneumatic tire,
wherein the roughened region comprises a plurality of lands and a plurality of dimples formed between adjacent lands, the plurality of lands comprises a plurality of first lands and a plurality of second lands formed such that the first lands and the second lands are alternately arrayed in the circumferential direction and that the first lands and the second lands are inclined relative to a radial direction of the pneumatic tire in opposite inclination directions, and the plurality of lands and the plurality of dimples are formed such that the plurality of dimples is arrayed in a plurality of rows partitioned by a land extending in the circumferential direction between an outer periphery and an inner periphery of the roughened region and comprises a plurality of large dimples and a plurality of small dimples alternately arrayed to form each of the rows.

13. The pneumatic tire according to claim 12, wherein each of the first lands has an absolute value of an inclination angle which is set in a range of 10 degrees to 30 degrees, and each of the second lands has an absolute value of an inclination angle which is set in a range of 10 degrees to 30 degrees.

14. The pneumatic tire according to claim 13, wherein each of the first lands has the absolute value of the inclination angle which is set to be equal to the absolute value of the inclination angle of each of the second lands.

15. The pneumatic tire according to claim 14, wherein the inner periphery of the roughened region is formed on the radially inner side of a position 20 mm away in a radially outward direction from the radially outer edge of the normal rim.

16. The pneumatic tire according to claim 13, wherein the inner periphery of the roughened region is formed on the radially inner side of a position 20 mm away in a radially outward direction from the radially outer edge of the normal rim.

17. The pneumatic tire according to claim 12, wherein each of the first lands has an absolute value of an inclination angle which is set to be equal to an absolute value of an inclination angle of each of the second lands.

18. The pneumatic tire according to claim 17, wherein the inner periphery of the roughened region is formed on the radially inner side of a position 20 mm away in a radially outward direction from the radially outer edge of the normal rim.

19. The pneumatic tire according to claim 12, wherein the inner periphery of the roughened region is formed on the radially inner side of a position 20 mm away in a radially outward direction from the radially outer edge of the normal rim.

20. The pneumatic tire according to claim 12, wherein the plurality of lands and the plurality of dimples are formed such that each of the large dimples has an isosceles trapezoidal shape and each of the small dimples has an isosceles trapezoidal shape.

* * * * *